US006973292B2

(12) United States Patent
Liao

(10) Patent No.: US 6,973,292 B2
(45) Date of Patent: Dec. 6, 2005

(54) MULTI-FUNCTION TELEPHONE HANDSET

(76) Inventor: Sheng Hsin Liao, No. 10, Alley 38, Lane 229, San Chun St, Shulin City (TW)

( * ) Notice: Subject to any disclaimer, the term of this patent is extended or adjusted under 35 U.S.C. 154(b) by 463 days.

(21) Appl. No.: 10/194,060

(22) Filed: Jul. 15, 2002

(65) Prior Publication Data
US 2004/0198242 A1  Oct. 7, 2004

(51) Int. Cl.[7] ............................................. H04M 1/00
(52) U.S. Cl. ................ 455/100; 455/569.1; 455/575.6; 379/428.02; 379/433.03; 379/436
(58) Field of Search .................... 455/95, 97, 100, 455/556.1, 575.1, 575.3, 575.4, 575.6, 90.3, 455/414.1, 569.1; 379/420.03, 420.04, 426, 379/428.02, 430, 431

(56) References Cited

U.S. PATENT DOCUMENTS

| | | | | |
|---|---|---|---|---|
| 5,511,120 A | * | 4/1996 | Hirata et al. ........... | 379/433.02 |
| 5,943,627 A | * | 8/1999 | Kim et al. ............... | 455/569.1 |
| 6,052,603 A | * | 4/2000 | Kinzalow et al. ........... | 455/557 |
| 6,073,031 A | * | 6/2000 | Helstab et al. .............. | 455/557 |
| 6,141,418 A | * | 10/2000 | Weiser et al. ................ | 379/454 |
| 6,223,029 B1 | * | 4/2001 | Stenman et al. ............ | 455/420 |
| 6,269,259 B1 | * | 7/2001 | Lai .......................... | 455/569.1 |
| 6,510,325 B1 | * | 1/2003 | Mack et al. ............. | 455/575.2 |

* cited by examiner

Primary Examiner—Edward F. Urban
Assistant Examiner—Thuan Nguyen
(74) Attorney, Agent, or Firm—Browdy and Neimark, PLLC

(57) ABSTRACT

A multi-function telephone handset comprises a handset body on which is defined a receiving space, and a holding element to which is mounted a receiver and a transmitter. Two opposite portions of the handset body are respectively formed in a receiver part and a transmitter part respectively provided with sound holes. The holding element, with the receiver and the transmitter thereto connected, is detachably placed in the receiving space of the handset body. The telephone handset can be thereby configured to in a manner to perform either a conventional telephonic communication by manually holding the telephone handset, or a hand-free telephonic communication can be achieved by carrying the holding element on the user's head.

10 Claims, 7 Drawing Sheets

MULTI-FUNCTION TELEPHONE HANDSET

BACKGROUND OF THE INVENTION

1. Field of the Invention

The invention relates to a multi-function telephone handset and, more particularly, to a telephone handset that allows a utilization by carrying on a user's head or by conventional handling.

2. Description of the Related Art

FIG. 1 is a perspective view that illustrates a conventional telephone apparatus provided with a traditional telephone handset 10a. The telephone handset 10a is connected to a telephone base 30a via either wire communication of a cable 20a or wireless transmission through infrared or radio frequency signals. A receiver and a transmitter (not shown) are fixedly mounted in the telephone handset 10a.

During a telephonic communication, if the user needs to have both hands free, or if fatigue of the hand that handles the telephone handset occurs due to a prolonged time of communication, the user may uses his/her head and shoulder to clamp and hold the telephone handset. This holding position of the telephone handset is however unstable and may be further improperly placed relative to the ears and the mouth of the user, which causes inappropriate conditions of communication. Moreover, a prolonged time of communication with the telephone handset held between the head and the shoulder causes fatigue of the user's neck.

SUMMARY OF THE INVENTION

It is therefore a principal object of the invention to provide a multi-function telephone handset that allows a flexible and convenient utilization by head carrying or manual holding.

It is another object of the invention to provide a multi-function telephone handset that can be configured in a manner to be carried on a user's head, which thereby enables to perform a hand-free telephonic communication without manually holding the telephone handset and overcomes the related problems as described above.

To accomplish the above and other objectives, a multi-function telephone handset of the invention comprises a handset body on which is defined a receiving space, and a holding element onto which is mounted a receiver and a transmitter. The holding element with the receiver and transmitter is capable of being detachably placed in the receiving space of the telephone handset.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
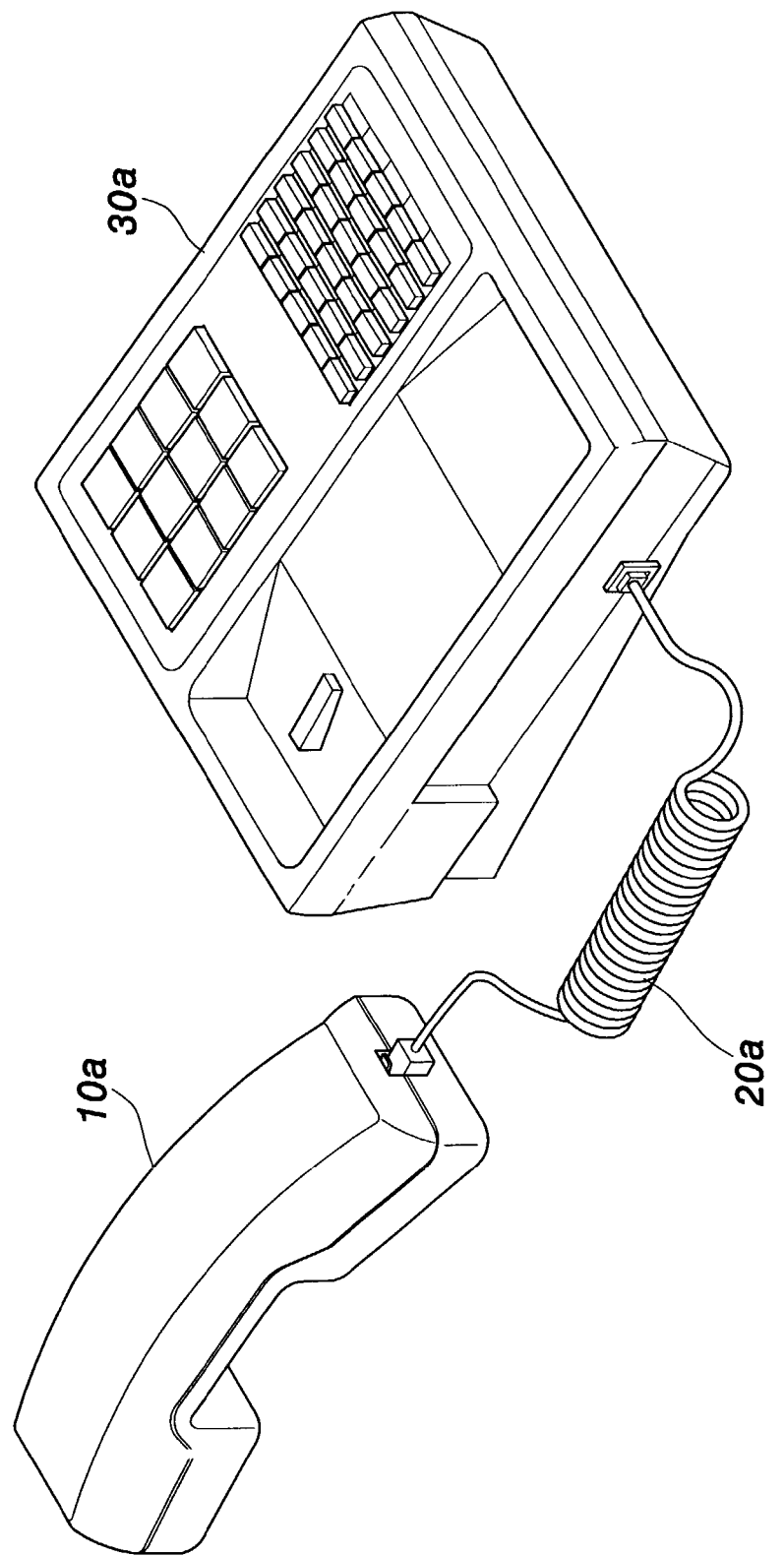
FIG. 1 is a perspective view schematically showing a conventional telephone apparatus.
Figure 2:
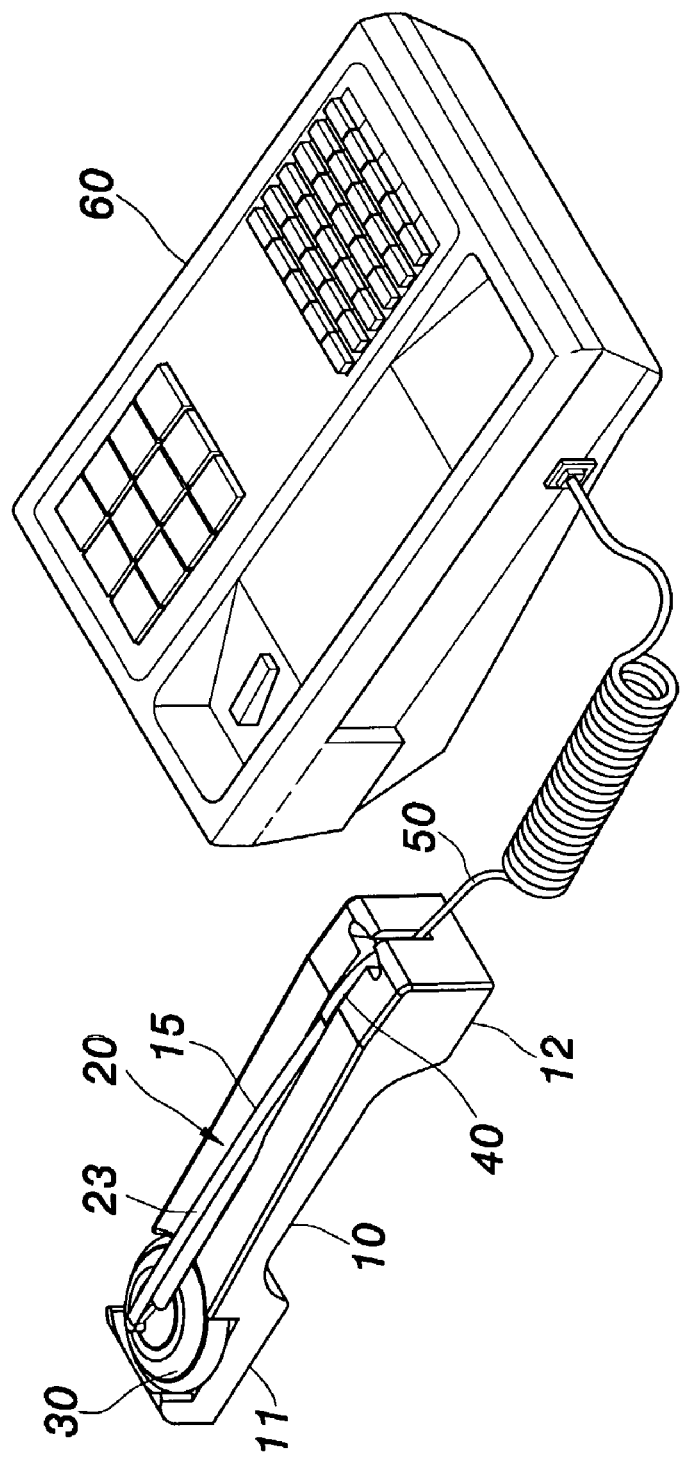
FIG. 2 is a perspective view of a first embodiment of the invention.
Figure 3:
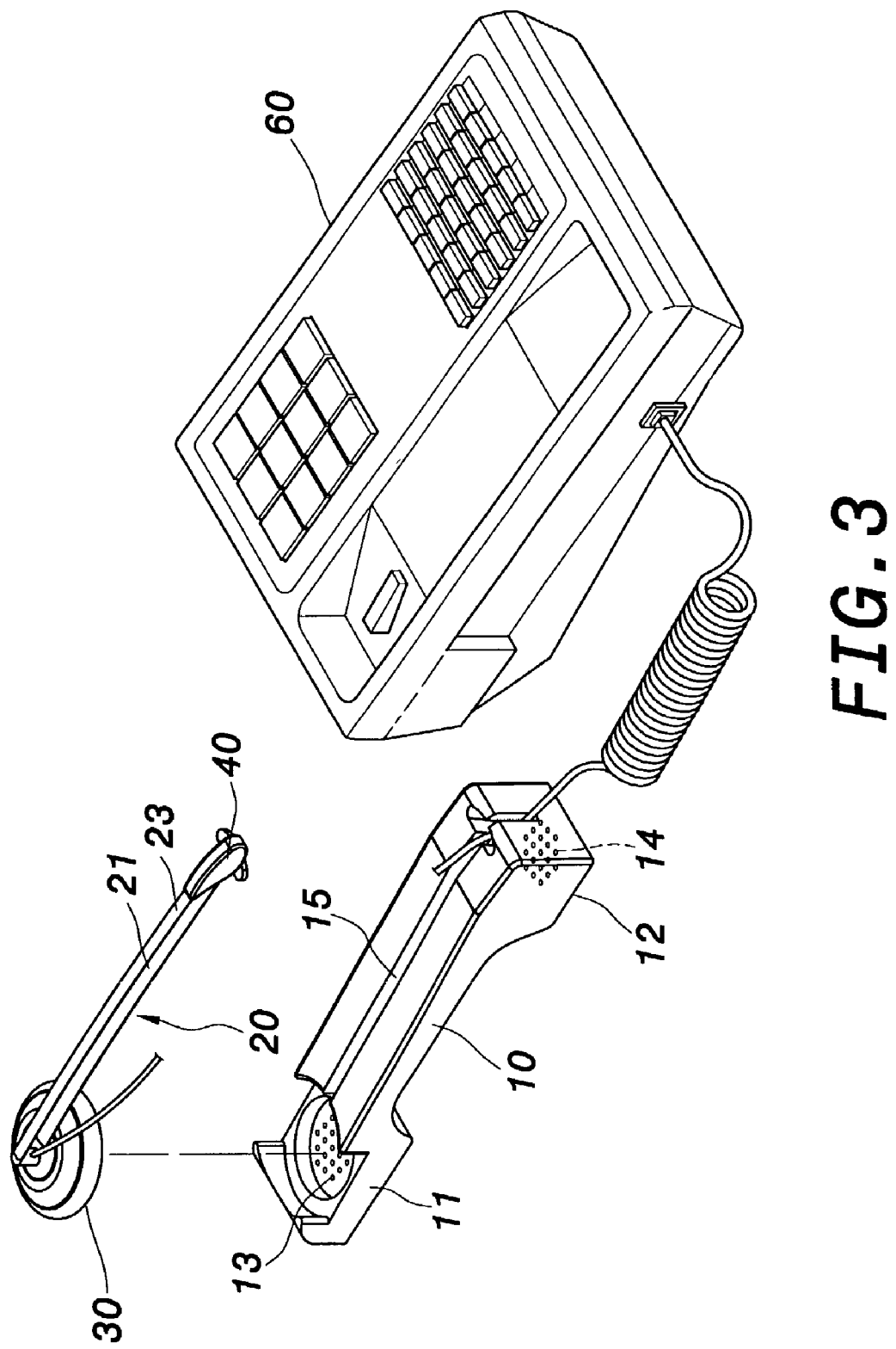
FIG. 3 is an exploded view of the first embodiment of the invention.

Wherever possible in the following description, like reference numerals will refer to like elements and parts unless otherwise illustrated.

Referring to FIG. 1 through FIG. 4, the invention provides a structure of multi-function telephone handset that comprises a handset body 10, a holding element 20, a receiver 30 and a transmitter 40. The outer aspect of the handset body 10 is approximately similar to that of a conventional telephone handset. Upper and lower portions of the handset body 10 are respectively formed into a receiver part 11 and a transmitter part 12 that are respectively provided with a plurality of sound holes 13, 14 for transmitting sound vibrations.

On a rear side of the handset body 10 is formed a receiving space 15 that extends longitudinally along the handset body 10 from its upper portion to its lower portion. Upper and lower sides of the receiving space 15 respectively communicate with the sound holes 13, 14 of the receiver and transmitter portions 11, 12.

The holding element 20 is constructed in a manner to be carried on a user's head, and is comprised of first, second and third rods 21, 22, 23. The first rod 21 is inwardly hollow so that the second rod 22 is capable of being slidably inserted in the first rod 21. The holding element 20 is thereby extendable and retractable to provide head carrying function and convenient arrangement. The third rod 23 is pivotally mounted to an end portion of the first rod 21 so as to be capable of conveniently folding onto (see FIG. 2 and FIG. 3) and unfolding from the first rod 21 (see FIG. 4).

When the second rod 22 outwardly extends from the first rod 21, the first and second rods 21, 22 together form a hoop-shaped holding element 20 that can be carried on the user's head. When the second rod 22 is retracted within the first rod 21 and the third rod 23 is folded on the first rod 21, the holding element 20 then can be placed in the receiving space 15 of the handset body 10.

The receiver 30 is an earphone-type receiver that is mounted to an upper end of the first rod 21. The transmitter 40 is a microphone-type transmitter that is mounted to an upper end of the third rod 23. The receiver 30 and the transmitter 40 are electrically connected to the telephone base 60 via a communication wire 50.

The receiver 30 and the transmitter 40 are mounted to the holding element 20 and, together with the holding element 20, are placed according to a detachable manner in the receiving space 15 of the handset body 10. In the receiving space 15, the receiver 30 and the transmitter 40 respectively face the sound holes 13, 14 so that sound transmission can be achieved through the handset body 10. The above construction constitutes an example of embodiment of a multi-function telephone handset of the invention.

Figure 4:
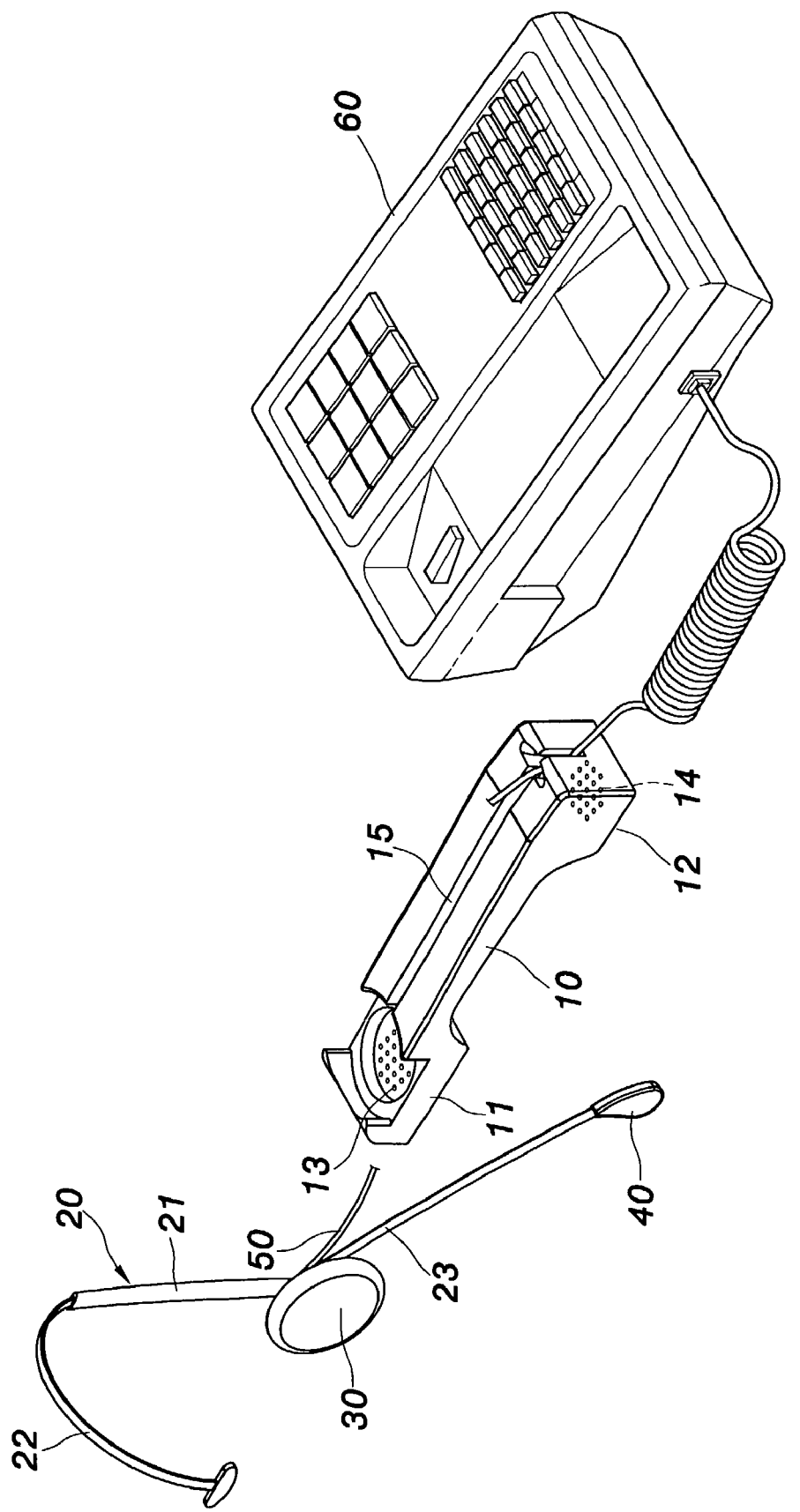
FIG. 4 is a perspective view showing the first embodiment of the invention in a configuration of utilization.

Referring to FIG. 4, the user can manually pull out the second rod 22 that with the first rod 21 therefore form a hoop-shaped holding element 20 which can be carried on the user's head. By further unfolding the third rod 23, the holding element 20 then can be placed on the user's head with the receiver 30 and the transmitter 40 respectively corresponding to the user's ears and the user's mouth. With the holing element 20 hence carried on the user's head, a free-hand telephonic communication is conveniently enabled.

When the receiver 30 and the transmitter 40 together with the holding element 20 are placed in the receiving space 15, the receiver 30 and transmitter 40 respectively facing the sound holes 13, 14 (see FIG. 2), the handset body 10 can be used as a conventional telephone handset. Similar to a conventional fixed telephone apparatus, the user can manually hold the telephone handset to perform a telephonic communication.

Via a detachable placement of the holding element 20 with the receiver 30 and the transmitter 40 in the handset body 10, the invention therefore allows a flexible utilization by either carrying the receiver and the transmitter on the head or manually holding the receiver and the transmitter received in the handset body. During a telephonic communication, if the user needs free hands or because of a prolonged conversation time the user's hands are tired, the telephone handset of the invention can be conveniently configured in a manner to be carried on the head. Free-hand telephonic communication is thereby enabled, which overcomes the conventional problems of unstable and inadequate holding of the telephone handset clamped between the head and the shoulder of the user, and consequent fatigue of the user's neck. The telephonic handset of the invention therefore enables a more convenient utilization compared to the telephone handset of the prior art.

Figure 5:
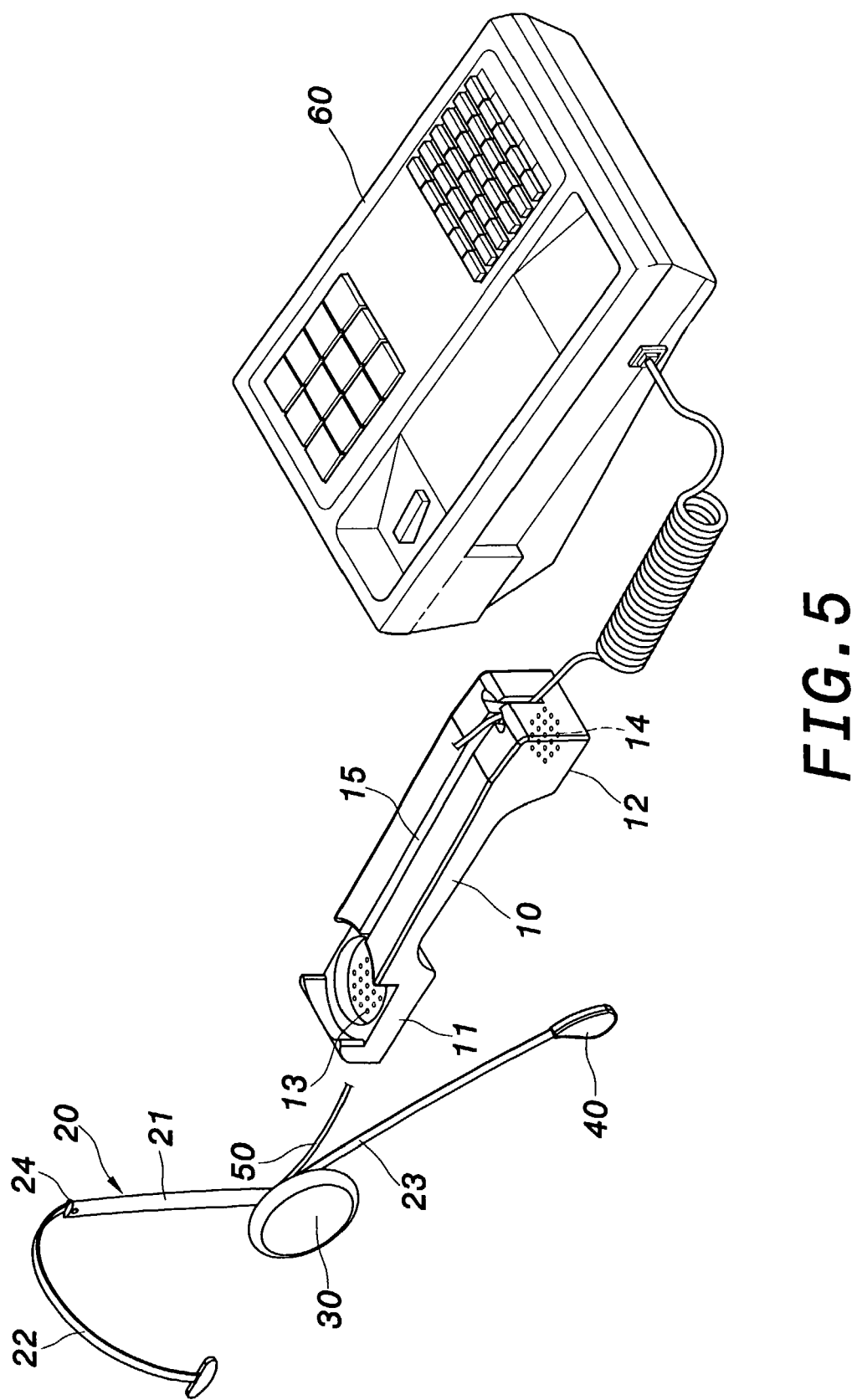
FIG. 5 is a perspective view of a second embodiment of the invention in a configuration of utilization.

Referring to FIG. 5, the holding element 20 can be alternatively constructed in a foldable manner with the first rod 21 pivotally connected to the second rod 22 via a hinge 24. The first and second rods 21, 22 can be thereby folded and unfolded relatively to each other to form the holding element 20.

When the first and second rods 21, 22 are unfolded, a hoop-shaped holding element 20 is formed to allow carrying on the user's head. By further arranging the receiver 30 and the transmitter 40 respectively corresponding to the ears and the mouth of the user, free-hand telephonic communication can be thereby achieved.

When the first and second rods 21, 22 are folded onto each other, the holding element 20 is placed in the receiving space 15 in such a manner that the receiver 30 and transmitter 40 respectively faces the sound holes 13, 14. The handset body 10 then can be handled as a conventional telephone handset to achieve a telephonic communication.

Figure 6:
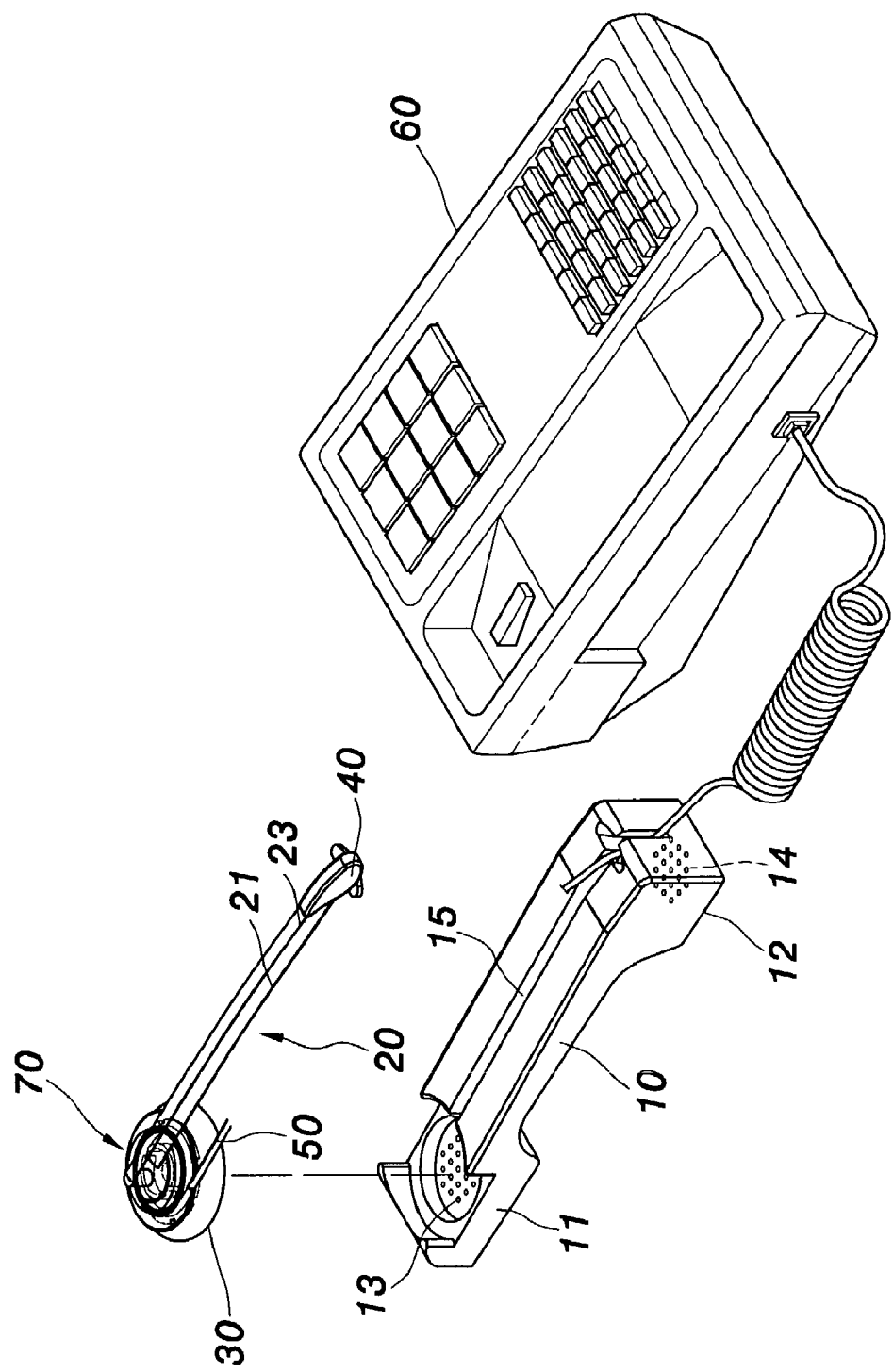
FIG. 6 is an exploded view of a third embodiment of the invention.

Referring to FIG. 6, the holding element 20 can be further provided with a winding case 70 that is capable of resiliently winding the communication wire 50. The winding case 70 is constructed in a manner to resiliently wind and receive a substantial length of communication wire 50. The winding case 70 is inwardly provided with a spiral spring (not shown) that enables to exert a certain level of tension through the communication wire 50 when it is pulled out. The communication wire 50 can be thereby adequately wound so as to provide an adequate length for utilization and prevent enlacing of excessively extended length of the communication wire 50.

Figure 7:
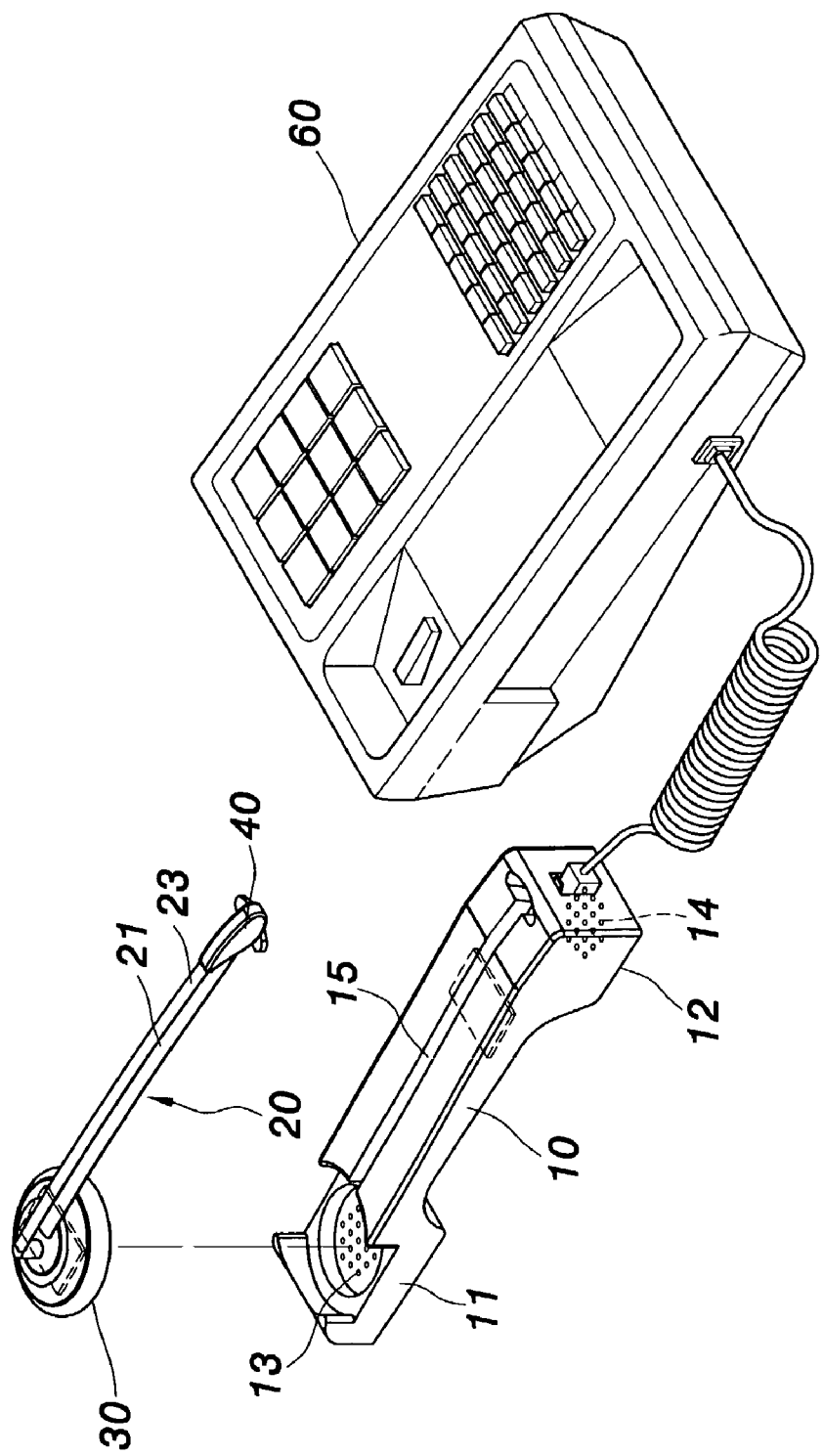
FIG. 7 is an exploded view of a fourth embodiment of the invention.

Referring to FIG. 7, the receiver 30 and the transmitter 40 alternatively can be connected to the telephone base 60 according to a wireless manner.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A structure of multi-function telephone handset, separably engaged to a desktop phone base which has keystrokes for dialing; and the structure comprising:
    a handset body, having a communication wire connected to the desktop phone base and a receiving space extending longitudinally therein;
    a holding element in the receiving space; and
    one receiver and one transmitter respectively mounted to the holding element, wherein the one receiver, the one transmitter and the holding element are detachably placed in the receiving space of the handset body so that the one receiver, the one transmitter and the holding element can be used when engaged to the handset body or separated from the handset.

2. The structure of claim 1, wherein the handset body has two end portions that are respectively formed in a receiver part and a transmitter part of the receiving space, and the receiver part and the transmitter part respectively have a plurality of sound holes communicating with the receiving space.

3. The structure of claim 1, wherein the receiving space extends on a rear side of the handset body.

4. The structure of claim 1, wherein the holding element comprises a first rod and a second rod, the second rod capable of being slidably inserted in and extending from the first rod, the first rod being further connected to a third rod.

5. The structure of claim 4, wherein the one receiver is mounted to the first rod of the holding element, and the one transmitter is mounted to the third rod of the holding element.

6. The structure of claim 5 wherein the one receiver is mounted to the first rod of the holding element, and the one transmitter is mounted to the third rod of the holding element.

7. The structure of claim 1, wherein the holding element comprises a first rod and a second rod that are pivotally connected by a hinge, the first and second rods being thereby capable of folding and unfolding relatively to each other, the first rod being further connected to a third rod.

8. The structure of claim 1, wherein the holding element is further provided with a winding case that is capable of resiliently winding the communication wire therein.

9. The structure of claim 1, wherein the one receiver is an earphone.

10. The structure of claim 1, wherein the one transmitter is a microphone.

* * * * *